2,796,934

SELECTIVE PLUGGING IN OIL WELLS

Lee C. Vogel, Long Beach, Calif., assignor to Union Oil Company of California, Los Angeles, Calif., a corporation of California No Drawing. Application June 25, 1954,
Serial No. 439,490

9 Claims. (Cl. 166—33)

This invention relates to the selective plugging of subterranean formations traversed by a well bore, and in particular concerns improved methods for selectively plugging subterranean water-producing formations which lie adjacent to or within oil-producing formations.

In a great many of the petroleum-producing areas of the United States, the production of crude oil from wells is accompanied by the production of water or brine. Well effluents comprising as much as 90 percent of water or brine and only 10 percent of petroleum are by no means uncommon. The cost of raising such water or brine to the earth's surface and of separating it from the oil represents an economic loss, and in many instances the problem of disposing of the waste water or brine is more than one of mere economics. In some instances the water-producing strata are more or less well-defined and lie at some distance from the oil-bearing strata, and in such cases the flow of water into the well can be shut off through the use of packers and well cementing techniques. In many localities, however, the oil- and water-producing strata lie very close together or are intermingled so that it is impossible to mechanically isolate the two and effect water shut-off by cementing.

The present invention is particularly directed to methods and compositions for effecting water shut-off in the latter type of situation, and is based on the concept of employing a liquid plugging composition which, in a given period of time, is capable of solidifying in the presence of water or brine under the conditions of temperature and pressure which prevail in well bores, but which does not form solids in the presence of oil. More particularly, the present invention is based on the discovery that the acid-catalyzed condensation of furfuryl alcohol and aldehydes to form water-insoluble solid condensation products can be controlled so as to take place much more rapidly in the presence of water or brine than in the presence of oil through the use of a particular class of acidic condensation catalysts, namely, organic acids having an ionization constant greater than about $1 \times 10^{-5}$ and being at least about 4 times as soluble in kerosene as in water. For example, I have found that a composition comprising furfuryl alcohol, paraformaldehyde and salicylic acid will resinify at 210° F. in the presence of water in about 4 hours, whereas at the same temperature and in the presence of oil such composition will form a solid only after about 48 hours. By injecting such a composition into water- and oil-producing formations penetrated by a well bore and allowing it to remain therein for a period between about 4 and about 48 hours, resinification will occur within the water-bearing interstices to form a water-insoluble plug therein which will effectively shut off the flow of water into the well. Within the oil-bearing interstices, however, no solid plug is formed in such period of time, and upon placing the well back into production the liquid composition will be washed therefrom by the flow of oil into the well leaving the oil-bearing formations unplugged. The invention thus consists in the method of using such compositions to effect a very substantial reduction in the flow of water or brine into a well bore without appreciably affecting the flow of oil.

The plugging compositions employed in the process of the invention essentially comprise furfuryl alcohol, an aldehyde and an organic acid condensation catalyst having an ionization constant greater than about $1 \times 10^{-5}$ and being at least about four times as soluble in kerosene than in water. Preferably, such compositions are employed in the form of aqueous solutions or dispersions comprising up to about 40 percent by weight of water. The aldehyde constituent is preferably formaldehyde or one of its congeners, i. e., paraformaldehyde or hexamethylenetetramine, but may be acetaldehyde, paraldehyde, propionaldehyde or other aldehyde being at least partially soluble in water and capable of condensing with furfuryl alcohol in the presence of acids to form resinous solids. Representative acid catalysts of the present class include, salicylic acid, alkyl-substituted succinic acids, alkyl-substituted benzenesulfonic acids, alkyl-substituted naphthalenesulfonic acids, etc. Dodecylbenzenesulfonic acid is preferred. The proportions of furfuryl alcohol and aldehyde may be varied between relatively wide limits depending upon the identity of the aldehyde and the exact properties desired in the ultimate condensation product, but will usually correspond to between about 0.1 and about 1.5 moles of aldehyde per mole of the alcohol. When paraformaldehyde is employed as the aldehyde it is usually provided in an amount representing between about 3 and about 10 percent by weight of the furfuryl alcohol. The amount of catalyst may likewise be varied over relatively wide limits to control the speed of the condensation reaction, but usually represents between about 2 and about 8 percent of the weight of the alcohol. As previously stated, the alcohol, aldehyde and acid catalyst components are preferably employed in aqueous form, i. e., in the form of aqueous solutions or dispersions of at least about 60 percent concentration. Conventional dispersing agents, e. g., petroleum hydrocarbon sulfonates, may be employed in preparing the aqueous compositions. Since the condensation reaction takes place relatively rapidly in the presence of water, the aqueous compositions should be prepared more or less immediately just prior to their use, and even the non-aqueous compositions should not be allowed to stand for more than a day or so before being injected into the formations to be treated.

The following examples will illustrate the formulation of a number of the plugging compositions of the invention, but are not to be construed as limiting the same.

*Example I*

| | Parts by weight |
|---|---|
| Furfuryl alcohol | 56 |
| Paraformaldehyde | 6 |
| Salicylic acid | 2 |
| Water | 40 |

*Example II*

| | |
|---|---|
| Furfuryl alcohol | 100 |
| Paraldehyde | 20 |
| Dodecylbenzenesulfonic acid | 4 |

*Example III*

| | |
|---|---|
| Furfuryl alcohol | 100 |
| Formaldehyde (37% aqueous) | 35 |
| Dodecylbenzene sulfonic acid | 5 |
| Water | 40 |

*Example IV*

| | |
|---|---|
| Furfuryl alcohol | 100 |
| Paraformaldehyde | 6 |
| $C_{10}$—$C_{12}$-alkylsuccinic acids | 6 |
| Water | 80 |
| Sodium lauryl sulfate | 2 |

Example V

| | |
|---|---|
| Furfuryl alcohol | 100 |
| Propionaldehyde | 80 |
| Alpha-naphthoic acid | 15 |

Various techniques may be employed for introducing the above described plugging compositions into subterranean formations penetrated by a well bore. In general, the procedure comprises filling the bore hole with drilling mud or other suitable fluid and introducing a charge of the plugging composition into the well tubing while displacing the mud or other fluid from the bore at the top of the well casing. The quantity of plugging composition employed depends upon the length and porosity of the formation being treated and the desired depth of penetration of the composition into the formation, and can readily be calculated from these factors. After introduction of the required quantity of plugging composition into the well tubing, drilling mud or other suitable fluid is forced down the tubing until the charge of plugging composition is opposite the formation. The outlet at the top of the well casing is then closed and pressure is applied to the fluid in the tubing to force the plugging charge out into the formation. The well is then allowed to stand under pressure for a period of time sufficient for the plugging composition to resinify in the presence of water but insufficient for it to form a solid in the presence of oil. Such time will depend upon the temperature and pressure conditions within the formation being treated and upon the identity and proportions of the components of the plugging composition, particularly the identity and amount of the acid catalyst, and can readily be determined by subjecting a sample of the particular composition being used to such conditions prior to introduction of the composition into the well bore. In most instances, substantially complete resinification occurs in the presence of water within from about 4 to about 12 hours, depending upon the factors mentioned above, whereas resinification in the presence of oil occurs within from about 48 to 72 hours. Usually, then, the well will be maintained under pressure for about 24–36 hours, after which the drilling mud or other fluid which fills the bore is pumped out and the well is allowed to produce in the normal manner. During the initial period of such production the flow of oil through the oil-bearing interstices washes the liquid plugging composition out of the oil-producing formation and into the well bore.

Various modifications of the foregoing general method may be employed. Thus, the treatment may be applied to formations of intermediate depth by the use of packers set between the tubing and the casing above and below such formations. Also, the fluid employed to transmit pressure from the well head to the plugging charge may be of the so-called "non-penetrating" type, e. g., a colloidal suspension of bentonite or starch. If desired the plugging composition may be introduced into the bore by means of a bailer, rather than via the tubing or casing. The treatment may be repeated one or more times, i. e., after the initial treatment the well may be placed in production for a short period of time to wash out the liquid plugging composition and thereafter given a second or even a third treatment with the same or a different plugging composition. Also, the plugging composition may be introduced into the formations in two or more increments without intervening production periods, and the increments may have the same or different composition. Other variations are well known in the art, and in general any of the conventional methods for injecting liquids into subterranean formations may be employed in carrying out the present process. The invention lies in the use of the particular plugging compositions defined herein to achieve the stated results, rather than in particular manipulative steps.

The following example will illustrate one way in which the principle of the invention may be applied:

Example VI

A well producing about 38 barrels per day of effluent comprising about 65% by volume of water and about 35% by volume of 28° API gravity oil from a bottom production interval about 20 feet thick at a depth of 3820 feet is "killed" and filled with oil-base drilling fluid. About 40 barrels of the following composition:

| | Parts by weight |
|---|---|
| Furfuryl alcohol | 100 |
| Paraformaldehyde | 30 |
| Dodecylbenzene sulfonic acid | 8 |
| Water | 85 | is pumped down the well tubing ahead of a further quantity of drilling fluid while displacing drilling fluid from the well annulus at the surface. When the quantity of drilling fluid pumped down the tubing is such that the plugging composition is opposite the producing interval, the well annulus is closed and an additional 35 barrels of drilling fluid is forced down the casing under a pressure of about 120 p. s. i. The well is then allowed to stand under pressure for about 24 hours, after which the pressure is released and the drilling fluid is bailed out of the bore. After swabbing the production interval, running in the well pump and placing the well back into production, the water-to-oil ratio of the effluent is found to be decreased by better than 50 percent.

Other modes of applying the principle of my invention may be employed instead of those explained, change being made as regards the materials or methods employed, provided the compositions or steps stated by any of the following claims, or the equivalent of such stated compositions or steps, be obtained or employed.

I, therefore, particularly point out and distinctly claim as my invention:

1. The method for selectively plugging subterranean formations producing oil and water traversed by a well bore to decrease the production of water therefrom which comprises injecting into said formations a liquid composition comprising furfuryl alcohol, an aldehyde capable of undergoing reaction with said alcohol in the presence of an acidic condensation catalyst to form a solid condensation product, and sufficient of an acid having an ionization constant greater than $1 \times 10^{-5}$ and being at least four times as soluble in kerosene as in water to catalyze said reaction, said liquid composition having the property of condensing to form a solid product more rapidly in the presence of water than in the presence of oil; allowing said composition to remain in said formation for a period of time sufficient for said composition to resinify in the presence of water but insufficient for resinification in the presence of oil; and thereafter placing the well in production.

2. A method in accordance with claim 1 wherein the said aldehyde is provided in an amount corresponding to between about 0.1 and about 1.5 moles per mole of furfuryl alcohol.

3. A method in accordance with claim 1 wherein the said aldehyde is selected from the class consisting of formaldehyde, paraformaldehyde, hexamethylenetetramine, acetaldehyde and paraldehyde.

4. A method in accordance with claim 1 wherein the said acid is dodecylbenzenesulfonic acid.

5. A method in accordance with claim 1 wherein the said composition comprises the furfuryl alcohol, aldehyde and acid in a total amount representing at least about 60 percent by weight and water in an amount representing not more than about 40 percent by weight.

6. A method in accordance with claim 1 wherein the said composition comprises furfuryl alcohol, between about 3 and about 10 percent by weight thereof of paraformaldehyde and between about 2 and about 8 percent by weight thereof of said acid.

7. A method in accordance with claim 6 wherein the said acid is dodecylbenzenesulfonic acid.

8. A method in accordance with claim 6 wherein the said composition comprises at least about 60 percent of the therein defined mixture of furfuryl alcohol, aldehyde and acid and not more than about 40 percent of water.

9. A method in accordance with claim 8 wherein the said acid is dodecylbenzenesulfonic acid.

References Cited in the file of this patent

UNITED STATES PATENTS

| | | |
|---|---|---|
| 2,338,799 | Buckley et al. | Jan. 11, 1944 |
| 2,366,036 | Leverett et al. | Dec. 26, 1944 |
| 2,601,497 | Brown | June 24, 1952 |
| 2,670,339 | Edmunds | Feb. 23, 1954 |

FOREIGN PATENTS

| | | |
|---|---|---|
| 625,847 | Great Britain | July 5, 1949 |